INVENTOR.
Wolfgang Ganter

BY
Laurence R. Brown

INVENTOR.
Wolfgang Ganter

BY
Laurence R. Brown

INVENTOR.
Wolfgang Ganter
BY
Laurence R. Brown

INVENTOR.

Wolfgang Ganter

BY

Laurence R. Brown

United States Patent Office 3,541,777
Patented Nov. 24, 1970

3,541,777

CONTROL CIRCUIT FOR THE DRIVE OF A MOVEMENT-REGULATING OSCILLATOR FOR A TIMEKEEPING INSTRUMENT

Wolfgang Ganter, Schramberg-Sulgen, Wurttemberg, Germany, assignor to Messrs. Gebruder Junghans Gesellschaft mit beschrankter Haftung, Schramberg, Wurttemberg, Germany, a corporation of Germany Filed May 8, 1968, Ser. No. 727,484
Claims priority, application Germany, May 8, 1967, J 33,623
Int. Cl. G04c 3/00
U.S. Cl. 58—23 14 Claims

ABSTRACT OF THE DISCLOSURE

The invention concerns a control circuit for the drive of a movement-regulating oscillator of a timekeeping instrument, specifically of a clock, with an electronic main amplifier, specifically a transistor amplifier, which is controlled by a voltage generated by means of the relative motion between a magnetic system and a control element, and which supplies current impulses at its output end, passing through a driving coil and supplying the driving power to the movement-regulating oscillator, and with a second electronic control amplifier, specifically a transistor amplifier, which influences the operating characteristics of the first amplifier, dependent on the values affecting the oscillation of the movement regulator.

Figure 1:
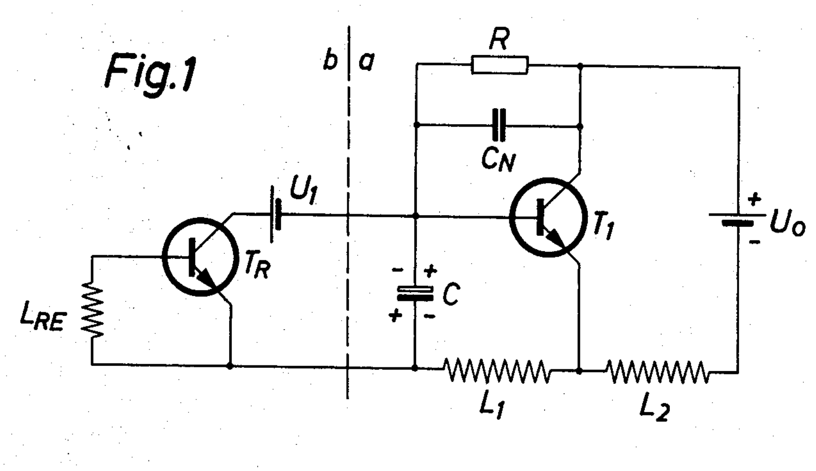

We know of a control circuit for an electrically driven oscillator for clocks, incorporating a transistor amplifier which is controlled by a voltage generated by means of the relative motion between a magnetic system and a control coil, and which supplies current impulses at the output end, passing through a driving coil and supplying the driving power to the movement regulating oscilaltor, in which process the control resistance in the form of a transistor is connected in parallel. In this known circuit a portion of the control voltage generated in the control coil is always diverted to the second transistor, which represents a continuous loss.

Furthermore, an electric automobile clock is known, in which a control voltage is induced in the first coil by means of the relative movement between the coil and the magnet, which generates a flow of current in a second coil through an electric circuit, in which a transistor is provided which functions to control and to transmit the energy for the mechanical oscillating system, and as a control resistance, which is controlled by means of a resistor and by means of a second transistor functioning as a regulating amplifier during voltage fluctuations in such a way as to keep the voltage across the drive coil constant, or nearly constant. In the case of this control circuit, influences other than voltage fluctuations on the movement's regulator amplitude are not taken into account, so that a stable amplitude cannot always be achieved, for example, in case of friction variations in the gearworks.

The invention is based on the problem of creating a control circuit of the type described above, which makes possible an effective amplitude stabilization of simple design, covering a wide range, and with good efficiency. This is achieved in this invention by the fact that, when the optimum voltage of the movement regulating oscillator is exceeded, the initial voltage of the main amplifier is reduced or reversed in polarity by means of the control amplifier which is influenced by the movement regulating oscillator, whereby the current saturating the drive coil is reduced or interrupted. A condenser may be connected in series within the control coil in the input circuit of the first electronic amplifier (main amplifier), to which is added a load resistance connected to a direct-voltage source, in which the second electronic amplifier (regulating amplifier), which is influenced by the movement regulating oscillator at the input end, bridges the condenser at the output end.

Dependent on the amplitude of the movement regulating oscillator the control circuit according to this invention causes a change in the point of action of the main amplifier supplying the power. Hence, the circuit operates with very little losses. It is usable for all oscillators occurring in practice.

The control amplifier may be connected directly in parallel to the condenser at its output end. But it is also possible to connect the control amplifier in parallel to the condenser, with its own output end in series to a source of reverse-charge voltage. In this arrangement a coil may be used as the source of reverse-charge voltage, which is influenced inductively by a magnetic field that moves in relation to it.

It is also possible to connect the control amplifier in parallel to the main amplifier on the output end of the series circuit consisting of a condenser and a control element. The control amplifier may also be connected in parallel to the main amplifier at the output end of the series circuit consisting of a condenser, a control element and the drive coil.

A special control coil, moved by the oscillating movement regulator relative to a magnetic field may be added to the control amplifier as a control element. But it is also possible to include a control coil common as a control element to the main amplifier and to the control amplifier. And finally, it is possible too, to place the drive coil and the control coil of the main amplifier into the input circuit of the control amplifier.

If desirable, a switching device dependent on a magnetic field or some other switching device sensitive to a magnetic field may be provided as a control element, which is influenced whenever a predetermined amplitude of oscillations is attained.

Figure 2:
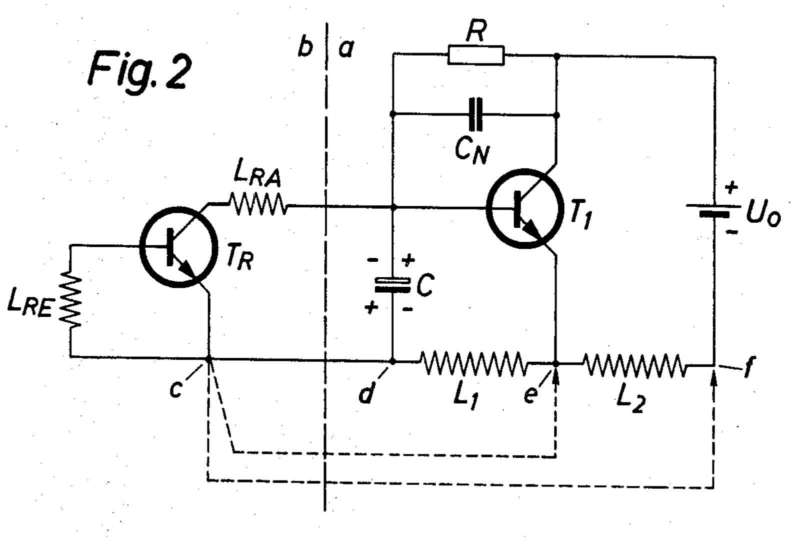
Figure 3:
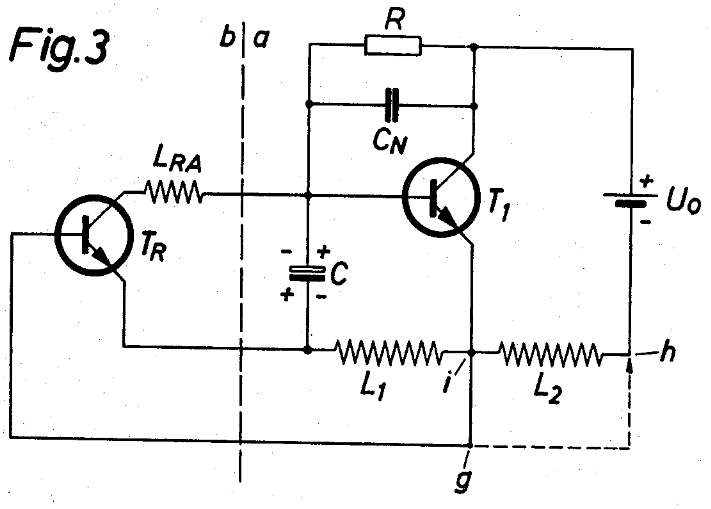
Figure 4:
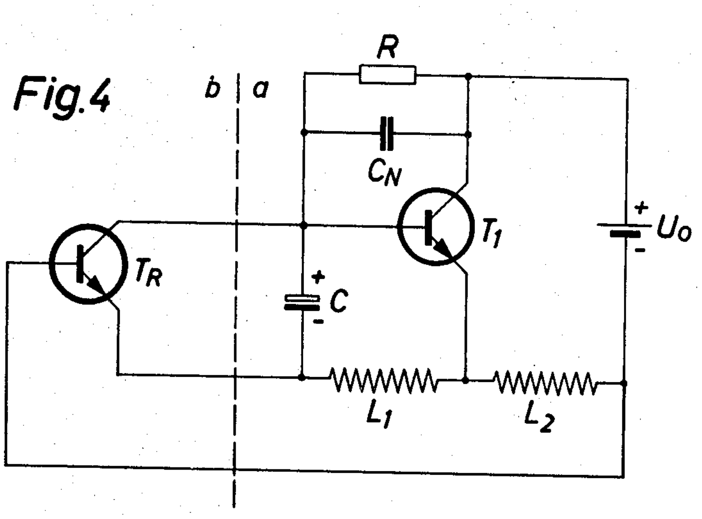
Figures 5A, 5B:
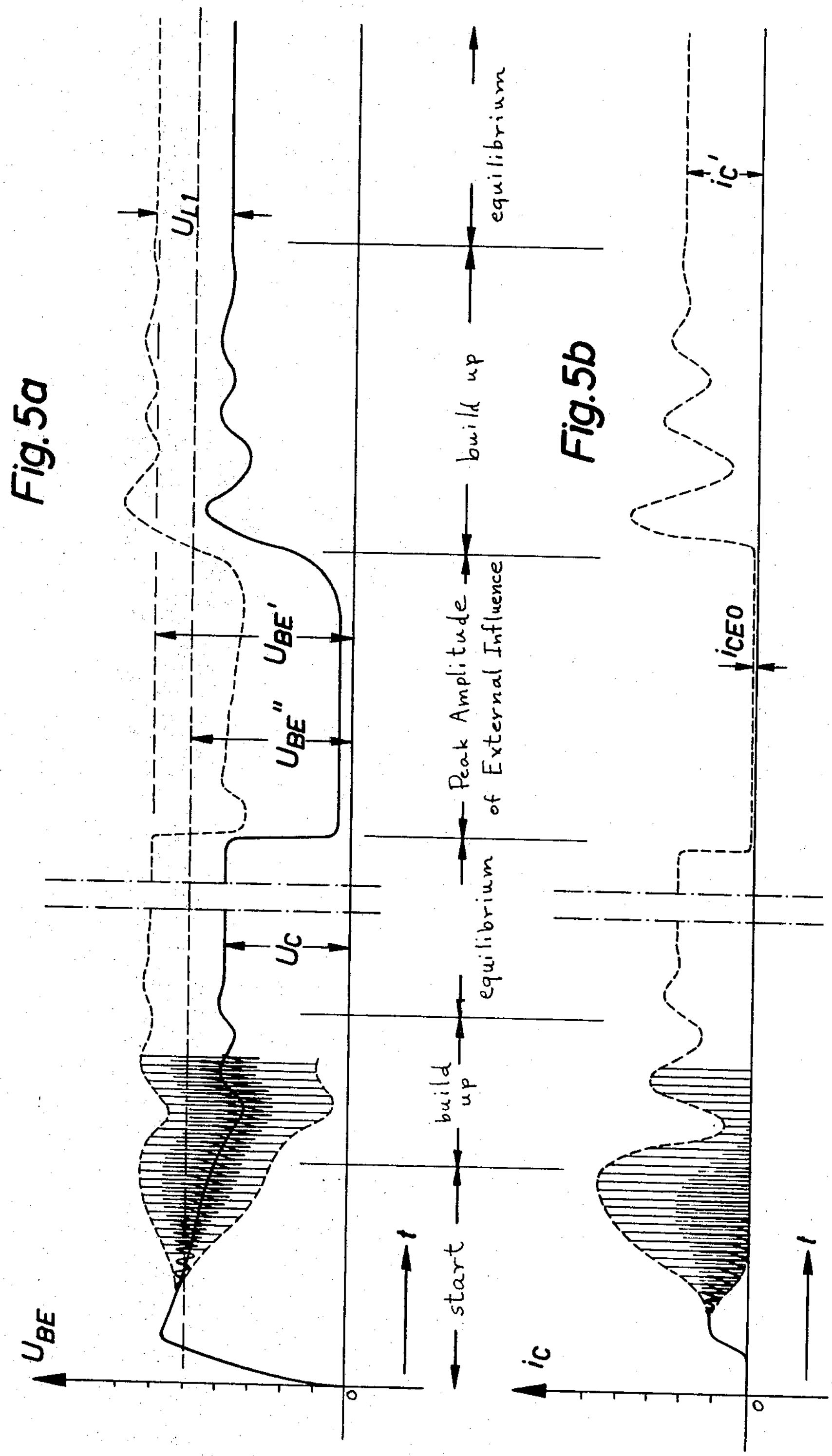
Figure 6:
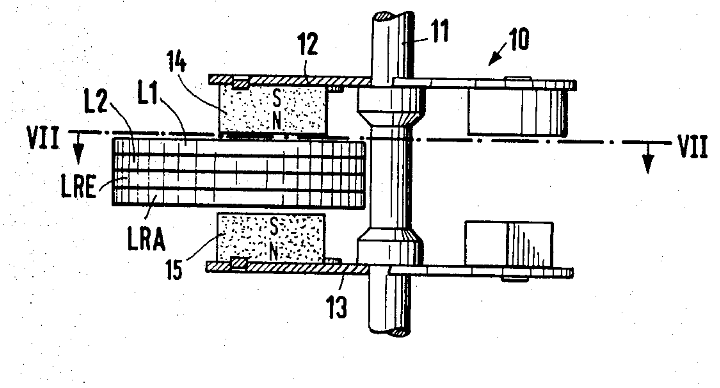
Figure 7:
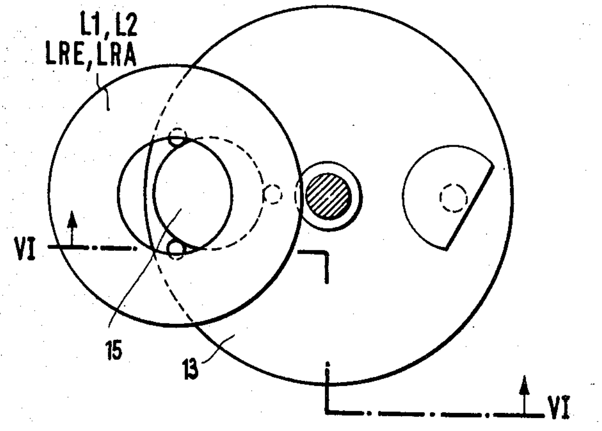

In the following specification the invention is explained in greater detail with reference to the drawings and their specific examples. In the drawing the figures depict:

FIG. 1—a circuit diagram of a first model of the control circuit according to this invention;

FIG. 2—a control circuit modified from the arrangement in FIG. 1;

FIG. 3—a further modification of the control circuit of this invention, in which but one single control coil is provided for both transistors;

FIG. 4—another modification which is particularly inexpensive to build;

FIGS. 5*a* and 5*b*—graphic depictions of the basic emitter voltage and of the collector current of the main transistor used in the circuit of FIG. 4;

FIG. 6—a side view of an escapement assembly with its coils, according to the circuit of FIG. 2, and partly sectioned along line VI—VI in FIG. 7; and FIG. 7—a section along Line VII—VII in FIG. 6.

In FIGS. 1–4, to the right of the dotted vertical line, the actual drive circuit is depicted, which is the same in all cases. This drive circuit contains the main transistor $T_1$, into whose basic emitter circuit a control element influenced by the movement regulating oscillator, specifically a control coil $L_1$, is connected in series with a condenser C. $L_2$ is the drive coil which lies in series with a direct voltage source $U_0$ in the base collector circuit of the transistor. The coils $L_1$ and $L_2$ may be installed coaxially close together in the conventional manner. They may also be wound concentrically to one another, for example, into one another. In order to suppress the reaction-coupling-oscillations that occur in the close coupling, a neutralization condenser $C_n$ has been provided in the example shown. Of course, it is also possible to use other conventional neutralizing elements to suppress the reaction-coupling-oscillations. R is a loading resistance, which is connected at one end to the positive pole of the direct voltage source $U_0$, and with the other end to the base of the transistor $T_1$. The coils may be arranged in relation to the movement regulating oscillator which influences them, according to FIGS. 6 and 7.

The arrangement including the coils $L_1$ and $L_2$ is preferably installed as a stationary unit, while a permanent magnet system is attached to the movement regulating oscillator (not shown), which is movable in relation to the coils. The magnet system moved by the movement regulating oscillator may be of any suitable type. Preferably a magnet system is selected that has two air gaps which admit the sides of the coils when the movement regulating oscillator is in a position of rest, and which are oppositely saturated with magnetic flux vertically to the plane of the coils.

The manner of operation of such a drive control circuit as such is known. But let us mention briefly that the condenser C is charged via resistance R according to the polarity indicated at the right, whereby the base of the main transistor $T_1$ received an initial positive charge, so that a collector current is already flowing. Very low control voltages in control coil $L_1$ are quite sufficient to effect a change in the collector current, through which the movement regulating oscillator receives its drive impulses. The voltage induced in the control coil $L_1$ increases with increasing amplitude of the oscillations, and by condenser C changes its charge by way of the base-emitter tract of transistor $T_1$, which is functioning as a rectifier, through which process the changed initial base voltage reverses polarity as indicated by polarity to the left of the condenser plates.

In FIG. 1 the series circuit consisting of the collector-emitter tract of the control transistor $T_r$, connected in parallel to condenser C in the base-emitter circuit of the main transistor $T_1$, is connected in series to a direct voltage source $U_1$ of any desired kind, which may be, for example, a primary element. This control transistor $T_r$ contains a control coil $L_{Te}$ in its input circuit, which may be assembled into a coil system, for example, with coils $L_1$ and $L_2$. Of course, it is also possible to install the control coil $L_{Te}$ separately and to supply it through a separate permanent magnet. In this case, as also with coils $L_1$ and $L_2$, it is, of course, possible to install the coils on the movement regulating oscillator and to employ a fixed system of magnets. But for simplicity's sake, a movable magnet system is preferred, which would act upon solidly installed coils. In the control coil $L_{Te}$ an induction voltage is set up which depends on the amplitude, which reaches the initial threshold-voltage of the control transistor $T_r$ at a certain amplitude of the movement regulator, in portable watches, for example, about 220°, so that this control transistor takes over the principal function. By this condition the condenser C located in the input circuit of the main transistor changes polarity (reverses its charge) through the direct voltage source $U_1$, and with that, the base initial voltage of the main transistor $T_1$ is affected. The working point of the main transistor $T_1$ is changed by this process in the direction of the input threshold-voltage, and the main transistor $T_1$ is no longer fully controlled. Hence, the amplitude of the movement regulating oscillator is reduced, whereby, in turn, the voltage in the control coil $L_{Te}$ decreases and the control transistor ($T_r$) is blocked, causing the working point of the main transistor $T_1$ to glide back toward the direction of increased controlling action. When lesser external influences are applied to the movement regulating oscillator, a block or a complete take-over of control are never achieved. The control action takes place in very finely graduated steps during relatively constant amplitudes near equilibrium as they are in practice. More severe interference with the state of equilibrium occurs only when severe external influences on the movement regulating oscillator come into play, so as to result in temporary total exclusion of the control transistor $T_r$ and the main transistor $T_1$ may be completely blocked.

In order to attain effective regulation during severe fluctuations in load, voltage or temperature, which may occur in either direction, the oscillator amplitude attainable when the control circuit is disconnected must be greater than the desired amplitude of equilibrium.

The voltage impulses set up in the control coil $L_{Te}$ may be put out of phase by 180° in relation to the voltage impulses set up in the regulating coil $L_1$, which can be achieved, for example, by reversing polarity through interchange of the leads of either coil $L_{Te}$ or coil $L_1$. In case of a conducting control transistor $T_r$ a change in polarity of condenser C is affected, in which there is no resulting drive impulse.

In order to eliminate the additional battery $U_1$, required according to FIG. 1, from the control circuit, the control circuit of FIG. 2 may be used, in which an additional induction coil $L_{Ta}$ is included in series with the control transistor $T_r$, which may be combined into a system of coils with the coils $L_1$, $L_2$, and $L_{Te}$, which system is influenced by the permanent magnet system carried by the movement regulator. In this case, the voltage generated in the induction coil $L_{Ta}$ is used for altering the charge of condenser C. The coil $L_{Ta}$ may, for instance, be wound together with the other coils, so that they are all simultaneously charged by the movable magnetic system.

The induction coil $L_{Ta}$ may also be omitted if the emitter of the control transistor $T_r$ (switch point *c*) is connected to the emitter of the main transistor $T_1$ (switch point *e*), or to the negative pole of the direct voltage source $U_0$ (switch point *f*). In the two last mentioned cases, however, the line connection between switch points *c* and *d* must be interrupted. Further, it is necessary to connect the control coil $L_{Te}$ in such a way as to set up voltage impulses in it which are 180° out of phase in relation to the regulating coil $L_1$.

In order to exploit the induction voltage (counter-electromotive force) of the drive coil $L_2$, the switch point *c* is connected to switch point *f*. In this arrangement a somewhat higher voltage is available for reverse charging condenser C.

The permanent magnet system carried by the movement regulator and the coils system on which it acts are depicted in an example in FIGS. 6 and 7. In this system coils $L_1$, $L_2$, $L_{Te}$ and $L_{Ta}$ are arranged coaxially to one another. 10 is an escapement oscillator with a shaft 11 and two bearing discs 12 and 13. Shaft 11 and bearing discs 12 and 13 consist of ferromagnetic material. 14 and 15 are two axially polarized, cylindrical permanent magnets, that form a magnetic air gap between them, into which the coils $L_1$, $L_2$, $L_{Ta}$ and $L_{Te}$ extend.

In the control circuit of FIG. 3, a common regulating coil $L_1$ is used for the main transistor $T_1$ and the control transistor $T_r$. In this arrangement the control impulse is shifted by 180° in relation to the drive impulse. Here too it is possible to connect the base of the control transistor $T_r$ (switch point *g*) to the negative pole of the direct voltage source $U_0$ (switch point *h*) or to the emitter (switch point *i*), as desired. In conecting the switch points *g* and *h*, the entrance voltage ($U_{be}$) of the control transistor $T_r$ is increased somewhat through action of the additional induction voltage in the drive coil $L_2$, so that, for instance, the amplitude of equilibrium may be slightly reduced. In connecting switch points *g* and *h*, of course, the line connection between switch points *i* and *g* must be disconnected.

The control circuit of FIG. 4 shows the simplest design. Here, in addition only the control transistor $T_r$ is needed. In this control circuit no separate source of auxiliary voltage for reversing the charge of the condenser at the entrance circuit of the main transistor $T_1$ is used. The condenser C, therefore, is not reversed, but simply discharged when the control transistor $T_r$ is leading. The maximal coil voltage $U_{11}$ under peak amplitude must be less than the initial threshold value of the main transistor. The control impulses are shifted 180° out of phase in relation to the drive impulses.

Let us mention further that, with the control circuits of FIGS. 1 to 3, the number of windings of coils $L_{Ta}$ and/or $L_1$ must be so adapted that the voltage induced in the regulating coil at peak amplitude of oscillations be less than the initial threshold value of the main transistor $T_1$.

In FIGS 5*a* and 5*b* graphic representations of the base-emitter voltage of the main transistor $T_1$ (FIG. 5*a*) and the collector current $i_c$ are shown with a control circuit according to FIG. 4.

The voltage $U_{be}$ is compounded from the voltage at condenser C and the control voltage induced in the control coil $L_1$. The heavy line is the mean voltage $U_c$ at condenser C, which is generated during the individual oscillations of the movement regulator. The upper dotted envelope curve corresponds to the sum of $U_c$ and $U_{11}$. The curves shown in FIGS. 5*a* and 5*b* were recorded with the aid of a charting oscillograph with a circuit arrangement according to FIG. 4.

At the beginning of the curve shown in FIG. 5*a* some of the very closely crowded control impulses $U_{11}$ and the variations of the condenser voltage $U_c$ are shown, which occur at every complete oscillation.

The dotted line shown in FIG. 5*b* represents the envelope curve of the collector current $i_c$. Here too, the driving impulses occurring at every oscillation are sketched in at the beginning of the curve.

In FIG. 5*a* a dotted horizontal line is sketched in which corresponds to the voltage $U_{be'''}$ which reaches the initial threshold value of the main transistor $T_1$.

At the starting time *"O"* of the graphic representation the movement regulating oscillator held fast in the neutral oscillaing position was turned loose. The voltage at the condenser C increases quickly and the movement regulating oscillator begins to oscillate with increasing amplitude. After a break-in period of the pendulum action the base emitter voltage begins to stabilize, and with it, the amplitude of equilibrium of the movement regulating oscillator. The voltage $U_{be}$, in the amplitude of equilibrium lies above the voltage of the initial threshold value of the main transistor $T_1$.

Through external induction the amplitude of the movement regulator oscillator was suddenly increased, whereby the tension $U_{be}$, quickly dropped to a value below that of the voltage of the initial threshold value. After several oscillations the voltage $U_{be}$, and with it, the amplitude of the oscillator swing back to the amplitude of equilibrium.

The curve of FIG. 5*b* shows a similar process as that of FIG. 5*a*. At the amplitude of equilibrium the driving impulses $i_c$ have stabilized and are screened out, that is, they are no longer or just barely visible in the sketched impulses of the curve. The driving impulses cease during the projected amplitude augmentation and only the residual collector current $i_{ceo}$, remains.

Type npn-transistors were used in the control circuits shown in the diagrams. But of course, pnp-transistors can be used just as well if the working point is properly adapted to the initial threshold voltage. In the latter case the voltage sources must be reversed in polarity.

In place of the control coil for the control transistor, a different conrol element may be provided too, which is influenced by a magnetic field. In this way, for example, a "Hall-element" may be used which is so installed in relation to the magnet that it is affected by the magnetic field when a pre-planned amplitude of the movement regulating oscillator is reached, whereby it makes an adjustment in the control transistor. Of course, it is also possible to use a switching element instead of the control transistor, which is directly influenced by a magnetic field, and to use this switching element for altering the initial base voltage of the main amplifier.

What is claimed is:

1. Control means for driving a movement regulating oscillator of a clock with a magnetic system relatively movable with respect to a control element, comprising in combination, a first transistor amplifier, output means for said amplifier including a driving coil supplying impulses to impart a driving force to said movement regulating oscillator, means establishing an input voltage level for said amplifier, a second control transistor amplifier having an output circuit connected to influence the operating characteristics of said first amplifier and input means developing direct current impulses from relative movement between said magnetic system and said control element, wherein said circuits have circuit parameters establishing a reduction of the input voltage level for said first amplifier by said control amplifier when the amplitude of the movement regulating oscillator exceeds a predetermined amplitude thereby causing said relative movement to generate driving impulses of greater amplitude and reducing the driving force to the movement regulating oscillator, wherein said means establishing the input voltage level for said amplifier is a condenser, said control element comprises a coil coupled in series with said condenser in the input circuit of said first amplifier, and the output circuit of said control amplifier bridges said condenser.

2. Control means as defined in claim 1, wherein a voltage source is coupled to said condenser through a resistor to maintain said input voltage level.

3. Control means as defined in claim 1, wherein a voltage source is coupled from said control amplifier to said condenser of such polarity to reverse the voltage on said condenser.

4. Control means as defined in claim 1, wherein an induction coil relatively movable with respect to said magnetic system with said movement regulating oscillator is coupled to provide a polarity reversing voltage to said condenser.

5. Control means as defined in claim 1, wherein the output circuit of said control amplifier is connected across the series circuit consisting of the condenser and the control element coil.

6. Control means as defined in claim 1, wherein the output circuit of said control amplifier is connected across a series circuit consisting of the condenser, the control element coil and the driving coil.

7. Control means as defined in claim 1, including a control coil relatively movable with respect to said magnet system with movement of the oscillating movement regulator and means connecting said control coil to the input circuit of said control amplifier.

8. Control means as defined in claim 1, wherein said control element coil is coupled as a control coil in the input circuits of both said amplifiers.

9. Control means as defined in claim 8, wherein said drive coil is connected into the input circuit of said control amplifier.

10. Control means as defined in claim 1, wherein at least two coils are coaxially related and closely spaced.

11. Control means as defined in claim 1, wherein the coils are wound concentrically.

12. Control means as defined in claim 1, wherein said control element coil is disposed about a plane, said magnet system comprises a permanent magnet moving with the movement regulator to extend on both sides of said control element coil when the movement regulator is in a state of rest and providing two air gaps oppositely saturated with magnetic flux and vertical to the coil plane on either side of said control element coil.

13. Control means as defined in claim 2, wherein the condenser and resistor have such values that double impulses occurring in a single direction of movement of the regulator are suppressed.

14. Control means as defined in claim 1, wherein said input means comprises a switching element influenced by the magnetic field of said magnetic system.

References Cited

UNITED STATES PATENTS 3,293,568 12/1966 Ganter et al. ---------- 58—23

RICHARD B. WILKINSON, Primary Examiner

E. C. SIMMONS, Assistant Examiner

U.S. Cl. X.R.

331—109